(12) United States Patent
Ganji et al.

(10) Patent No.: US 11,799,673 B2
(45) Date of Patent: Oct. 24, 2023

(54) HARDNESS AMPLIFICATION OF PHYSICAL UNCLONABLE FUNCTIONS (PUFS)

(71) Applicant: University of Florida Research Foundation, Incorporated, Gainesville, FL (US)

(72) Inventors: Fatemeh Ganji, Gainesville, FL (US); Shahin Tajik, Gainesville, FL (US); Jean-Pierre Seifert, Werder Havel (DE); Domenic Forte, Gainesville, FL (US); Mark M. Tehranipoor, Gainesville, FL (US)

(73) Assignees: UNIVERSITY OF FLORIDA RESEARCH FOUNDATION, INCORPORATED, Gainesville, FL (US); TECHNISCHE UNIVERSITAET BERLIN, Berlin (DE)

( * ) Notice: Subject to any disclaimer, the term of this patent is extended or adjusted under 35 U.S.C. 154(b) by 656 days.

(21) Appl. No.: 16/841,873

(22) Filed: Apr. 7, 2020

(65) Prior Publication Data
US 2023/0179434 A1    Jun. 8, 2023

Related U.S. Application Data

(60) Provisional application No. 62/836,829, filed on Apr. 22, 2019.

(51) Int. Cl.
| | | |
|---|---|---|
| H04L 9/00 | (2022.01) | |
| H04L 9/32 | (2006.01) | |
| H04L 9/08 | (2006.01) | |
| H03K 19/173 | (2006.01) | |
| H03K 19/096 | (2006.01) | |
| H03K 19/17748 | (2020.01) | |

(52) U.S. Cl.
CPC ......... *H04L 9/3278* (2013.01); *H03K 19/0963* (2013.01); *H03K 19/1737* (2013.01); *H03K 19/17748* (2013.01); *H04L 9/002* (2013.01); *H04L 9/0866* (2013.01); *H04L 9/3271* (2013.01)

(58) Field of Classification Search
None
See application file for complete search history.

(56) References Cited

U.S. PATENT DOCUMENTS

| | | | | |
|---|---|---|---|---|
| 8,054,098 | B2* | 11/2011 | Koushanfar et al. | H03K 19/17768 326/8 |
| 8,848,905 | B1* | 9/2014 | Hamlet et al. | H04L 9/3278 726/20 |

(Continued)

FOREIGN PATENT DOCUMENTS

WO   2016062782 A2*   4/2016   ............... G06F 21/602

*Primary Examiner* — Vibol Tan
(74) *Attorney, Agent, or Firm* — ALSTON & BIRD LLP (57) ABSTRACT

Combined physical unclonable function (PUFs); methods, apparatuses, systems, and computer program products for enrolling combined PUFs; and methods, apparatuses, systems, and computer program products for authenticating a device physically associated with a combined PUF are described. In an example embodiment, a combined PUF includes a plurality of PUFs and one or more logic gates. Each PUF includes a plurality of stages and an arbiter configured to generate a single PUF response based on response portions generated by the plurality of stages. The one or more logic gates are configured to combine the single PUF response for each of the plurality of PUFs in accordance with a combination function to provide a combined response.

19 Claims, 6 Drawing Sheets

(56) References Cited

U.S. PATENT DOCUMENTS

| | | | |
|---|---|---|---|
| 10,164,640 B1* | 12/2018 | Lu et al. ............... | G11C 16/045 |
| 10,439,613 B2* | 10/2019 | Karpinskyy et al. | H03K 19/003 |
| 10,777,265 B2* | 9/2020 | Cheng ................... | G11C 16/26 |
| 11,265,178 B1* | 3/2022 | Cohen ................... | G06F 21/73 |
| 11,271,758 B2* | 3/2022 | Lee et al. .............. | G06F 21/71 |
| 2019/0068190 A1* | 2/2019 | Karpinskyy et al. | H03K 19/003 |

* cited by examiner

HARDNESS AMPLIFICATION OF PHYSICAL UNCLONABLE FUNCTIONS (PUFS)

CROSS-REFERENCE TO RELATED APPLICATIONS

This application claims priority to U.S. Application No. 62/836,829, filed Apr. 22, 2019, the content of which is incorporated herein by reference in its entirety.

STATEMENT REGARDING FEDERALLY SPONSORED RESEARCH OR DEVELOPMENT

This invention was made with government support under grant number 1513239 awarded by the National Science Foundation and under grant number FA9550-14-1-0351 awarded by the U.S. Air Force Office of Scientific Research and under Grant number 60NANB16D248 award by the National Institute of Standards and Technology. The government has certain rights in the invention.

TECHNICAL FIELD

Various embodiments relate to the hardness amplification of PUFs. For example, various embodiments relate to the design and implementation of PUFs having a provable level of security.

BACKGROUND

A physical unclonable function (PUF) is a physically-defined "digital fingerprint" that serves as a unique identity for a device (e.g., a semiconductor device such as a microprocessor). A PUF is a physical entity embodied in a physical structure. For example, PUFs are often implemented in integrated circuits and are typically used in applications with high security requirements. After the introduction of the first strong PUF (e.g., a PUF with an exponential number of challenge-response pairs), it became soon evident that such PUFs are vulnerable to machine learning (ML) attacks. For example, an adversary can intercept the transmission of a subset of PUF challenge-response pairs (CRPs) between a prover and a verifier, and run an ML algorithm on the gathered CRPs to create a model of the PUF.

BRIEF SUMMARY

Various embodiments provide methods, apparatuses, systems, computer program products, and/or the like for the design, implementation, and use of PUFs that have a provable level of security. For example, various embodiments provide for hardness amplification of PUFs, wherein a PUF with a higher amount of hardness is more robust against ML attacks that a PUF with less hardness. To achieve the increased robustness of a PUF against ML attacks, the influential stages of the PUF may be identified and may be used to determine a rolling strategy for generating a rolled PUF. To further increase the robustness of a PUF against ML attacks (e.g., to further amplify the hardness of the PUF), a plurality of responses (e.g., generated by a single PUF in response to a plurality of challenges or generated by a plurality of PUFs associated with the same device in response to one challenge) may be combined to generate a combined PUF.

According to a first aspect, a combined PUF is provided. In an example embodiment, a combined PUF comprises a plurality of PUFs and one or more logic gates. Each PUF comprises a plurality of stages and an arbiter configured to generate a single PUF response based on response portions generated by the plurality of stages. The one or more logic gates are configured to combine the single PUF response for each of the plurality of PUFs in accordance with a combination function to generate a combined response.

According to another aspect, a method for enrolling a combined PUF is provided. In an example embodiment, the method comprises implementing a first PUF; based on an analysis of the first PUF, determining a number of PUFs for the combined PUF; and implementing the number of PUFs such that a response of each PUF of the number of PUFs is combined in accordance with a combination function to generate a combined response.

According to still another aspect, an apparatus configured for enrolling a combined PUF is provided. In an example embodiment, the apparatus comprises at least one processor, a memory, and a communication interface. The at least one processor is in communication with an interrogator and a response receiver. The memory stores computer executable instructions that, when executed by the at least one processor, cause the apparatus to at least based on an analysis of an implementation of a first PUF, determine a number of PUFs for the combined PUF. The memory stores computer executable instructions that, when executed by the at least one processor, cause the apparatus to cause the implementation of the number of PUFs such that a response of each PUF of the number of PUFs is combined in accordance with a combination function to generate a combined response. In an example embodiment, the apparatus may receive the combined response (e.g., via the response receiver) in response to a challenge issued (e.g., by the interrogator) and store an indication and/or representation of the combined response in association with a unique identifier associated with the combined PUF and/or a device with which the combined PUF is physically associated.

According to yet another aspect, a computer program product configured for enrolling a combined PUF is provided. In an example embodiment, the computer program product comprises at least one non-transitory computer readable memory storing computer-executable code portions. The computer-executable code portions comprise computer-readable code portions are configured to, when executed by a processor of an apparatus comprising a processor and a communication interface, with the processor being in communication with an interrogator and a response receiver, cause the apparatus to, based on an analysis of an implementation of a first PUF, determine a number of PUFs for the combined PUF; and cause the apparatus to cause the implementation of the number of PUFs such that a response of each PUF of the number of PUFs is combined in accordance with a combination function to generate a combined response. In an example embodiment, the computer-executable code portions comprise computer-readable code portions that are configured to, when executed by the processor of the apparatus, cause the apparatus to receive the combined response (e.g., via the response receiver) in response to a challenge issued (e.g., by the interrogator) and store an indication and/or representation of the combined response in association with a unique identifier associated with the combined PUF and/or a device with which the combined PUF is physically associated.

According to another aspect, a method for authenticating a combined PUF and/or a device with which a combined PUF is physically associated is provided. In an example embodiment, the method comprises issuing a challenge to the combined PUF (e.g., via an interrogator); receiving a response from the combined PUF (e.g., via a response receiver); and determining (e.g., via a processor) whether the response matches an expected response based on the challenge and authentication information stored in association with an identifier configured to identify the combined PUF. The combined PUF generates the response by determining a plurality of individual responses, each of the plurality of individual responses generated by one of a plurality of PUFs of the combined PUF, and combining the plurality of individual responses in accordance with a combination function.

According to still another aspect, an apparatus configured for authenticating a combined PUF and/or a device with which a combined PUF is physically associated is provided. In an example embodiment, the apparatus comprises at least one processor, a memory, and a communication interface. The at least one processor is in communication with an interrogator and a response receiver. The memory stores computer executable instructions that, when executed by the at least one processor, cause the apparatus to at least cause the interrogator to issue a challenge to the combined PUF; receive a response generated by the combined PUF and detected by the response receiver; and determine whether the response matches an expected response based on the challenge and authentication information stored in association with an identifier configured to identify the combined PUF. The combined PUF generates the response by determining a plurality of individual responses, each of the plurality of individual responses generated by one of a plurality of PUFs of the combined PUF, and combining the plurality of individual responses in accordance with a combination function.

According to yet another aspect, a computer program product configured for enrolling a combined PUF is provided. In an example embodiment, the computer program product comprises at least one non-transitory computer readable memory storing computer-executable code portions. The computer-executable code portions comprise computer-readable code portions are configured to, when executed by a processor of an apparatus comprising a processor and a communication interface, with the processor being in communication with an interrogator and a response receiver, cause the apparatus to cause the interrogator to issue a challenge to the combined PUF; receive a response generated by the combined PUF and detected by the response receiver; and determine whether the response matches an expected response based on the challenge and authentication information stored in association with an identifier configured to identify the combined PUF. The combined PUF generates the response by determining a plurality of individual responses, each of the plurality of individual responses generated by one of a plurality of PUFs of the combined PUF, and combining the plurality of individual responses in accordance with a combination function.

BRIEF DESCRIPTION OF THE SEVERAL VIEWS OF THE DRAWING(S)

Having thus described the invention in general terms, reference will now be made to the accompanying drawings, which are not necessarily drawn to scale.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. The terms "approximately" and "substantially" are used herein to refer to being within appropriate manufacturing and/or engineering tolerances. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and/or flowchart illustrations. Thus, it should be understood that each block of the block diagrams and/or flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

Figure 1:
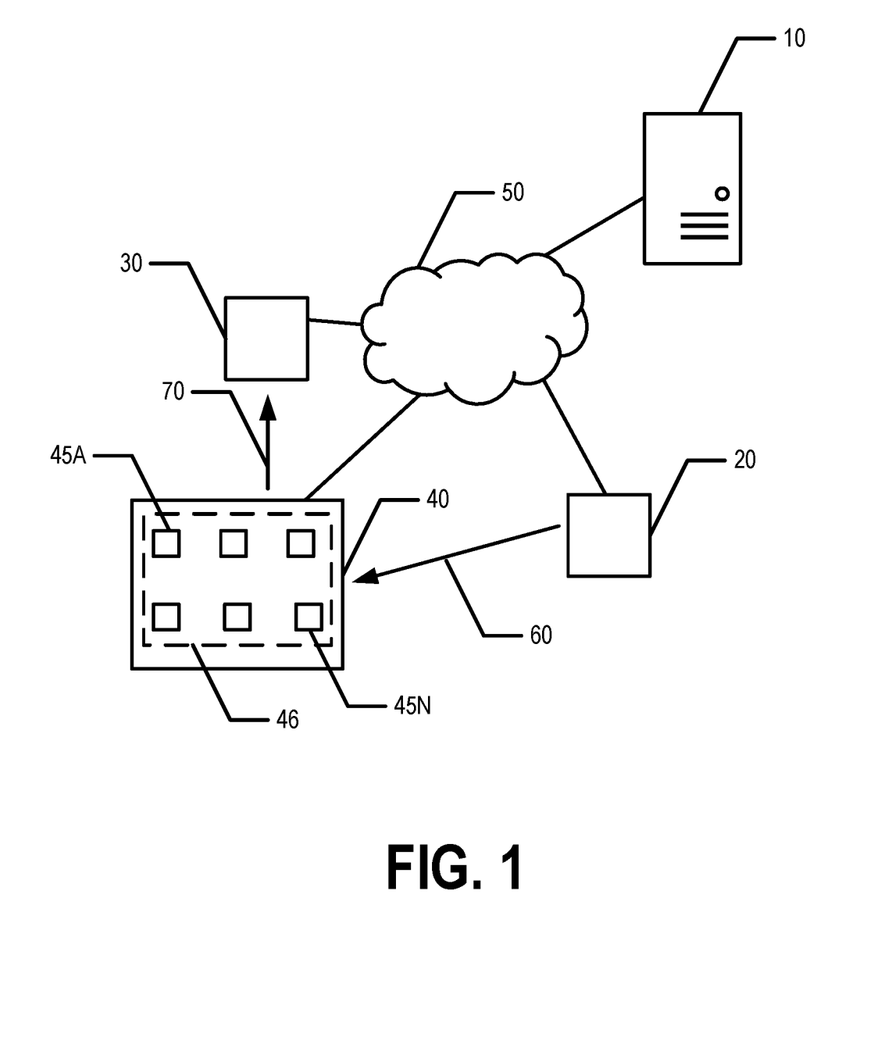
FIG. 1 is an overview of a system that can be used to practice embodiments of the present invention.
Figure 3:
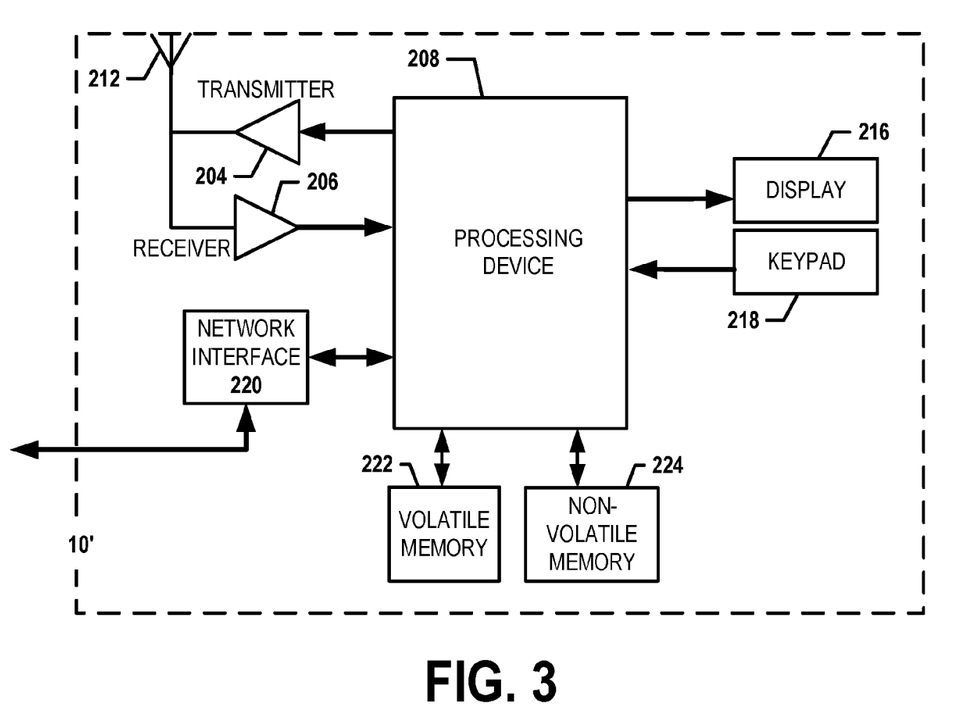
FIG. 3 is an exemplary schematic diagram of another computing entity according to one embodiment of the present invention.

FIG. 1 provides an illustration of an exemplary embodiment of the present invention. As shown in FIG. 1, this particular embodiment may include one or more computing entities 10 (or 10′, as shown in FIG. 3), one or more interrogators 20, one or more response receivers 30, one or more devices 40 each physically associated with one or more PUFs 45A-45N, one or more networks 50, and/or the like. Each of these components, entities, devices, systems, and similar words used herein interchangeably may be in direct or indirect communication with, for example, one another over the same or different wired or wireless networks 50.

While FIG. 1 illustrates the various system entities as separate, standalone entities, the various embodiments are not limited to this particular architecture. In various embodiments, an interrogator 20 and response receiver 30 may be integrated into a single device. In various embodiments, a computing entity 10, 10′ comprises an interrogator and/or response receiver 30. In an example embodiment, the computing entity 10, 10′ is in communication with one or more interrogators 20 and/or one or more response receivers 30 via direct communication and/or via network 50. In various embodiments, the computing entity 10, 10′ may authenticate a device 40 (e.g., via an interrogator 20 and response receiver 30) based on the response(s) 70 received by the response receiver 30 in response to one or more challenges 60 issued to the one or more PUFs 45A-45N that are physically associated with the device 40. In an example embodiment, one or more PUFs 45A-45N are physically secured to the device 40 with which the one or more PUFS 45A-45N are physically associated. In various embodiments, the one or more PUFs 45A-45N are physically associated with the device 40 as the PUFs 45A-45N are integrally formed with one or more components (e.g., semiconductors, integrated circuits, and/or the like) of the device 40. In an example embodiment, the one or more PUFs 45A-45N are a combined PUF 46. In various embodiments, a combined PUF 46 is a PUF generated from a plurality of PUFs 45A-45N that are configured to provide a combined response that is generated by combining the response generated by each PUF 45A-45N, in response to a challenge, in a predetermined manner.

1. Exemplary Computing Entity

Figure 2:
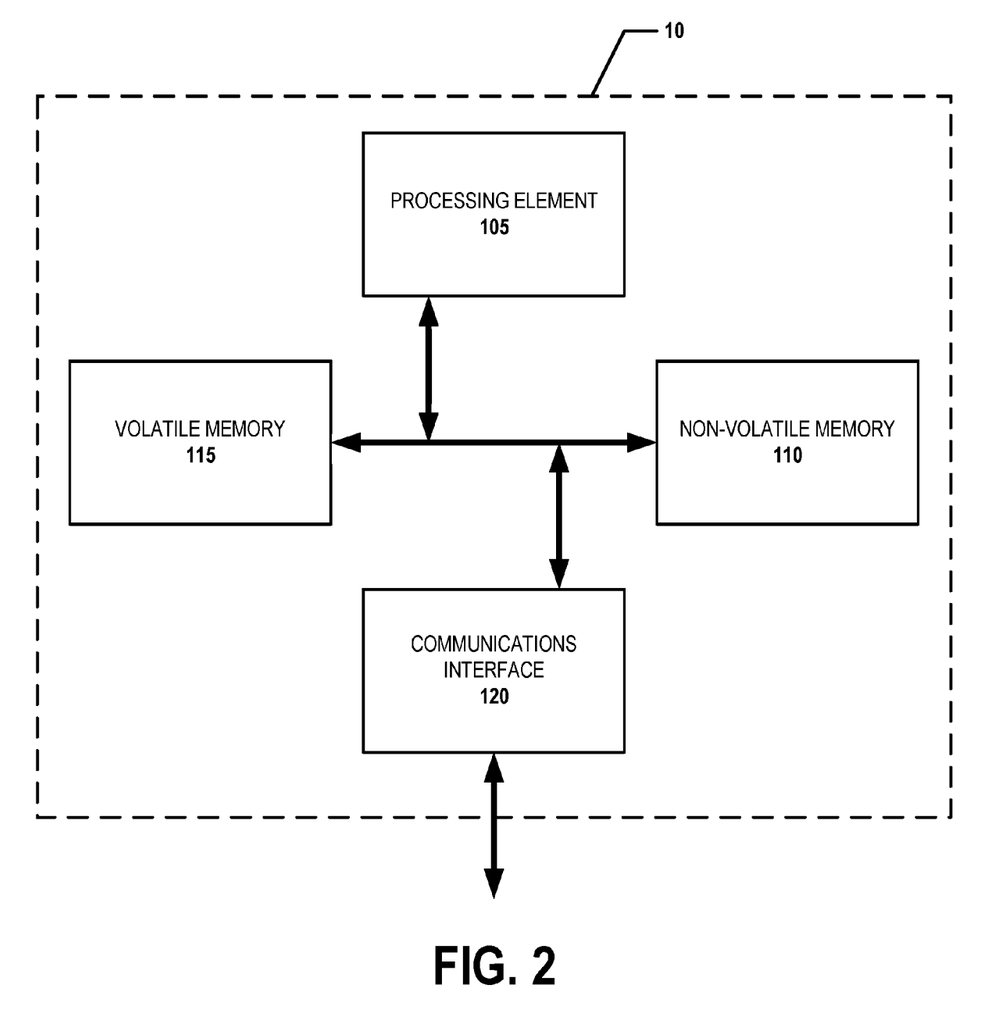
FIG. 2 is an exemplary schematic diagram of a computing entity according to one embodiment of the present invention.

FIG. 2 provides a schematic of a computing entity 10 according to one embodiment of the present invention. In an example embodiment, a computing entity 10 may be configured to perform one or more enrollment processes for enrolling a device 40 and/or one or more PUFs 45A-45N physically associated with the device 40 for use in authenticating the device 40. In an example embodiment, a computing entity 10 may authenticate and/or confirm the identify of a device 40 (and/or a component thereof) based on a combined response received from one or more PUFs 45A-45N physically associated with the device 40 in response to one or more challenges.

In general, the terms computing entity, computer, entity, device, system, and/or similar words used herein interchangeably may refer to, for example, one or more computers, computing entities, desktops, mobile phones, tablets, phablets, notebooks, laptops, distributed systems, input terminals, servers or server networks, blades, gateways, switches, processing elements, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the computing entity 10 may also include one or more communications interfaces 120 for communicating with various other computing entities, such as by communicating data, content, information, and/or similar terms used herein interchangeably that can be transmitted, received, operated on, processed, displayed, stored, and/or the like.

As shown in FIG. 2, in one embodiment, the computing entity 10 may include or be in communication with one or more processing elements 105 (also referred to as processors, processing circuitry, and/or similar terms used herein interchangeably) that communicate with other elements within the computing entity 10 via a bus, for example. As will be understood, the processing element 105 may be embodied in a number of different ways. For example, the processing element 105 may be embodied as one or more complex programmable logic devices (CPLDs), microprocessors, multi-core processors, co-processing entities, application-specific instruction-set processors (ASIPs), microcontrollers, and/or controllers. Further, the processing element 105 may be embodied as one or more other processing elements or circuitry. The term circuitry may refer to an entirely hardware embodiment or a combination of hardware and computer program products. Thus, the processing element 105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 105 may be configured for a particular use or configured to execute instructions stored in volatile or non-volatile media or otherwise accessible to the processing element 105. As such, whether configured by hardware or computer program products, or by a combination thereof, the processing element 105 may be capable of performing steps or operations according to embodiments of the present invention when configured accordingly.

In one embodiment, the computing entity 10 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 110, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the computing entity 10 may further include or be in communication with volatile media (also referred to as volatile storage, memory, memory storage, memory circuitry and/or similar terms used herein interchangeably). In one embodiment, the volatile storage or memory may also include one or more volatile storage or memory media 115, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 105. Thus, the databases, database instances, database management systems, data, applications, programs, program modules, scripts, source code, object code, byte code, compiled code, interpreted code, machine code, executable instructions, and/or the like may be used to control certain aspects of the operation of the computing entity 10 with the assistance of the processing element 105 and operating system.

As indicated, in one embodiment, the computing entity 10 may also include one or more communications interfaces 120 for communicating with various other computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi, Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown in FIG. 2, the computing entity 10 may also comprise a user interface (that can include a display coupled to a processing element). For example, the user interface may include or be in communication with one or more input elements, such as a keyboard input, a mouse input, a touch screen/display input, motion input, movement input, audio input, pointing device input, joystick input, keypad input, and/or the like. The computing entity 10 may also include or be in communication with one or more output elements (not shown), such as audio output, video output, screen/display output, motion output, movement output, and/or the like. These input and output elements may include software components such as a user application, browser, graphical user interface, and/or the like to facilitate interactions with and/or cause display of information/data from the computing entity 10, as described herein. The user input interface can comprise any of a number of devices or interfaces allowing the computing entity 10 to receive data, such as a keypad (hard or soft), a touch display, voice/speech or motion interfaces, or other input device. In embodiments including a keypad, the keypad can include (or cause display of) the conventional numeric (0-9) and related keys (#, *), and other keys used for operating the computing entity 10 and may include a full set of alphabetic keys or set of keys that may be activated to provide a full set of alphanumeric keys. For example, the enrollment and/or authentication of a device 40 may occur in response to user input received via the user interface.

As will be appreciated, one or more of the components of the computing entity 10 may be located remotely from other components of the computing entity 10, such as in a distributed system. Furthermore, one or more of these components may be combined with additional components to perform various functions described herein, and these additional components may also be included in the computing entity 10. Thus, the computing entity 10 can be adapted to accommodate a variety of needs and circumstances. As will be recognized, these architectures and descriptions are provided for exemplary purposes only and are not limiting to the various embodiments.

2. Another Exemplary Computing Entity

FIG. 3 provides an illustrative schematic representative of another example computing entity 10' that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, wearables, input terminals, servers or server networks, blades, gateways, switches, processing elements, processing entities, set-top boxes, relays, routers, network access points, base stations, the like, and/or any combination of devices or entities adapted to perform the functions, operations, and/or processes described herein. Such computing entities 10' can be operated by various parties. As shown in FIG. 3, the computing entity 10' can include an antenna 212, a transmitter 204 (e.g., radio), a receiver 206 (e.g., radio), and a processing element 208 (e.g., CPLDs, microprocessors, multi-core processors, coprocessing entities, ASIPs, microcontrollers, and/or controllers) that provides signals to and receives signals from the transmitter 204 and receiver 206, respectively.

The signals provided to and received from the transmitter 204 and the receiver 206, respectively, may include signaling information in accordance with air interface standards of applicable wireless systems. In this regard, the computing entity 10' may be capable of operating with one or more air interface standards, communication protocols, modulation types, and access types. More particularly, the computing entity 10' may operate in accordance with any of a number of wireless communication standards and protocols, such as those described above with regard to the computing entity 10. In a particular embodiment, the computing entity 10' may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 10' may operate in accordance with multiple wired communication standards and protocols, such as those described above with regard to the computing entity 10 via a network interface 220.

Via these communication standards and protocols, the computing entity 10' can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10' can also download changes, add-ons, and updates, for instance, to its firmware, software (e.g., including executable instructions, applications, program modules), and operating system.

According to one embodiment, the computing entity 10' may include location determining aspects, devices, modules, functionalities, and/or similar words used herein interchangeably. For example, the computing entity 10' may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the computing entity's 10' position in connection with a variety of other systems, including cellular towers, Wi-Fi access points, and/or the like. Similarly, the computing entity 10' may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 10' may also comprise a user interface (that can include a display 216 coupled to a processing element 208) and/or a user input interface (coupled to a processing element 208). For example, the user interface may be configured to provide a user application, browser, interactive user interface, and/or similar words used herein interchangeably executing on and/or accessible via the computing entity 10' to interact with and/or cause display of information from the device 40 and/or another computing entity 10, 10', as described herein. The user input interface can comprise any of a number of devices or interfaces allowing the computing entity 10' to receive data, such as a keypad 218 (hard or soft), a touch display, voice/speech or motion interfaces, or other input device. In embodiments including a keypad 218, the keypad 218 can include (or cause display of) the conventional numeric (0-9) and related keys (#, *), and other keys used for operating the computing entity 10' and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The computing entity 10' can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the computing entity 10'. As indicated, this may include a user application that is resident on the entity or accessible through a browser or other user interface for communicating with the computing entity 10 and/or various other computing entities.

In another embodiment, the computing entity 10' may include one or more components or functionality that are the same or similar to those of the computing entity 10, as described in greater detail above. As will be recognized, these architectures and descriptions are provided for exemplary purposes only and are not limiting to the various embodiments. In an example embodiment, the functions described as being performed by the computing entity 10' are performed by a client (e.g., a thin client) of the computing entity 10'.

3. Exemplary Device

In various embodiments, the device 40 may be a computing entity and/or a component of a computing entity (e.g., microprocessor, processor, memory, field-programmable gate array (FPGA), and/or other component comprising an integrated circuit). For example, in an example embodiment, the device 40 may comprise a processor, memory, a communications interface configured to communicate via one or more networks, a user interface, and/or the like. For example, in one embodiment, a device 40 may include one or more components that are functionally similar to those of the computing entity 10, computing entity 10', and/or the like. For example, in one embodiment, device 40 may include one or more processing elements (e.g., CPLDs, microprocessors, multi-core processors, co-processing entities, ASIPs, microcontrollers, and/or controllers), volatile and non-volatile storage or memory, one or more communications interfaces, and/or one or more user interfaces. In another example embodiment, the device 40 is a component of a computing entity (e.g., a processing element, volatile or non-volatile storage or memory, communication interface, user interface, and/or the like). In an example embodiment, the device 40 is an RFID tag that is physically associated and/or secured to another item such that the identity of the item may be securely determined and/or confirmed.

Figure 4:
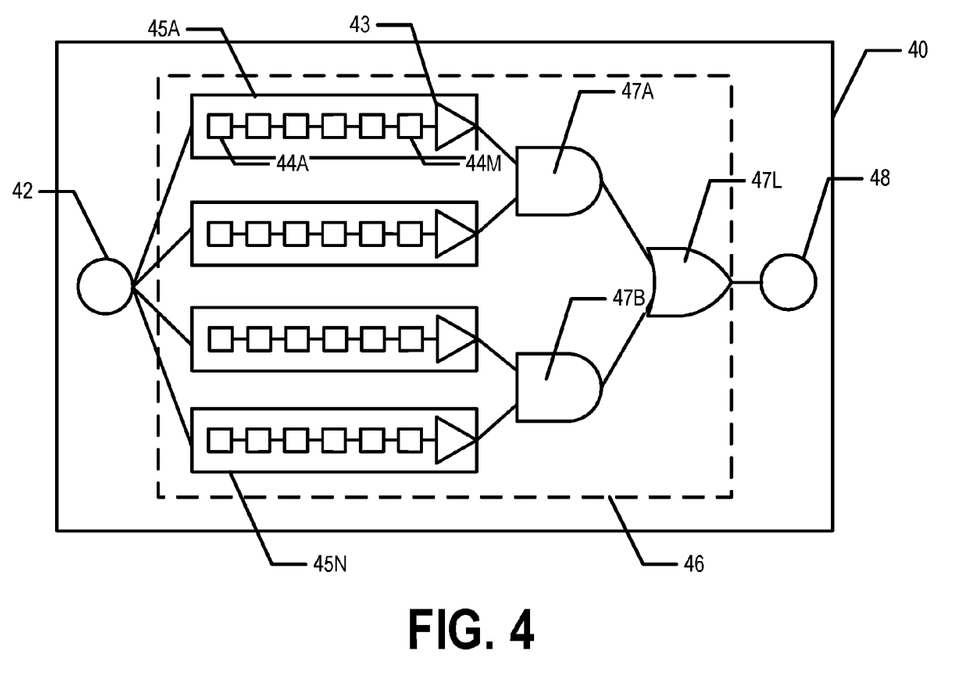
FIG. 4 is an exemplary schematic diagram of a combined PUF according to one embodiment of the present invention.

In various embodiments, one or more PUFs 45A-45N and/or the combined PUF 46 are physically associated with the device 40. For example, the PUFs 45A-45N and/or combined PUF 46 may be physically secured to and/or part (integrally formed) of the device 40 and/or a component thereof. For example, a PUF 45A-45N, a combined PUF 46, and/or a portion thereof may be integrally formed with the device 40 and/or a portion thereof, in an example embodiment. FIG. 4 provides a schematic diagram of an example combined PUF 46 that is physically associated with device 40. In an example embodiment, each PUF 45A-45N may comprise a plurality of stages 44A-44M and an arbiter 43 configured for controlling the response provided by the corresponding one or more PUFs 45A-45N. For example, the arbiter 43 may be configured to combine a plurality of response portions generated by a plurality stages 44A-44M of a PUF 45A-45N in response to a received challenge. For example, a challenge may be received via a challenge receiver 42 and provided to each of the PUFs 45A-45N. The response generated by each PUF 45A-45N in response to the received challenge may be provided to one or more logic gates 47A-47L configured to enact a combining function to combine the response generated by the individual PUFs 45A-45N to generate a combined response for the combined PUF 46. The combined response may then be provided via a response provider 48 such that the response receiver 30 may receive the combined response. In various embodiments the challenge receiver 42 and the response provider 48 are the same hardware component of the combined PUF 46 and/or device 40. In various embodiments, the challenge receiver 42 and/or response provider 48 may be an antenna, communication interface configured to communicate via one or more networks and/or one or more communication protocols, and/or the like.

4. Exemplary Interrogator & Response Receiver

In various embodiments, a computing entity 10, 10' comprises and/or is in communication (e.g., directly and/or via one or more networks 50) with one or more interrogators 20 and/or response receivers 30. In an example embodiment, an interrogator 20 is configured to issue one or more challenges 60 to one or more PUFs 45A-45N (and/or a combined PUF 46) physically associated with a device 40. In an example embodiment, a response receiver 30 is configured to receive one or more responses 70 to challenges 60 issued by the interrogator 20 from the one or more PUFs 45A-45N (and/or combined PUF 46) physically associated with the device 40. In various embodiments, a response receiver does not distinguish between combined responses generated and/or provided by a combined PUF 46 and responses generated and/or provided by individual PUFs 45A. Thus, the response 70 may be combined response or a response provided by an individual PUF 45A. In various embodiments, the interrogator 20 issues a challenge 60 and the response receiver 30 receives a response 70 via a short range communication protocol, medium range communication protocol, or long range communication protocol. For example, in an example embodiment, the interrogator 20 is a radio frequency transmitter and the response receiver 30 is radio frequency receiver. For example, the interrogator 20 and the response receiver 30 may be a radio frequency transceiver and/or the like configured to read radio frequency identification tags (RFID tags), in an example embodiment. In another example embodiment, the interrogator 20 may transmit a challenge 60 via a network 50 (e.g., Wi-Fi and/or other network) and the response receiver 30 may receive the response 70 via the network 50 and/or another network.

III. Exemplary System Operation

Example embodiments of the present invention provide for designing, implementing, and using PUFs (e.g., combined PUFs) with amplified hardness. For example, embodiments of the present invention provide for designing, implementing, and using PUFs that have a provable level of security and/or robustness against ML attacks. In various embodiments, the response 70 is generated by a PUF 45A and/or combined PUF 46 in response to a challenge 60. For example, the challenge 60 may be received and may initiate a response process in one or more stages of each PUF 45A-45N. The response portions generated by the response processes of the one or more stages may be combined and/or processed by an arbiter of the combined PUF 46. In various embodiments, one or more stages of the PUF may be rolled and/or switched. For example, the response portion provided by the response process of one stage may be switched with another response portion (e.g., generated by a different stage and/or the like). In various embodiments, one or more logic gates may combine two or more responses (e.g., using a Tribes function and/or the like) generated by two or more PUFs 45A-45N to generate a combined response. For example, in various embodiments, the device 40 may comprise a plurality of PUFs 45A-45N. The responses of two or more of the plurality of PUFs 45A-45N may be combined (e.g., by one or more logic gates) to generate the combined response which is the signature of the combined PUF 46. In various embodiments, the response generated by the two or more of the plurality of PUFs 45A-45N may be combined using a Tribes function. In an example embodiment, one or more logic gates may combine two or more responses (e.g., using a Tribes function and/or the like) generated by a PUF 45A in response to two or more challenges. In various embodiments, the rolling of one or more response portions and/or the combination of two or more responses may provide for the PUFs to provide a response (e.g., a combined response) that prevents any party that may "eaves drop" on the communication between the combined PUF 46 (e.g., comprising PUFs 45A-45N) and the interrogator 20 and/or response receiver 30 from obtaining low noise CRPs for the PUFs 45A-45N.

Figure 5:
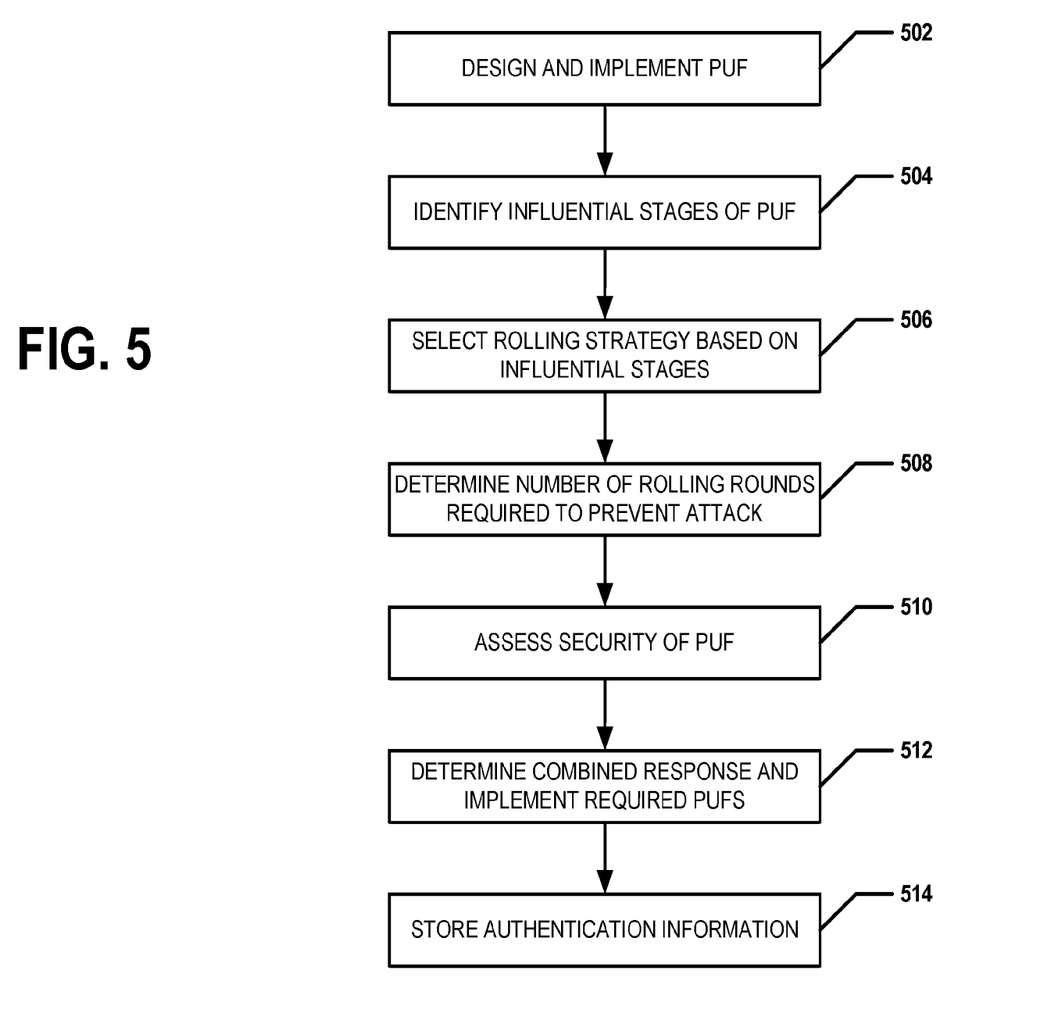
FIG. 5 provides a flowchart illustrating various processes, procedures, and/or operations performed, for example by a computing entity, for enrolling a device physically associated with a PUF according to an example embodiment.

Enrollment of a Device And/or Plurality of PUFs Physically Associated With the Device FIG. 5 provides a flowchart illustrating various processes, procedures, operations, and/or the like for enrollment of a PUF (e.g., a combined PUF 46), according to an example embodiment. In various embodiments, enrollment of a PUF includes the generation and storage of authentication information/data that may be used to authenticate a device 40 comprising the PUF (e.g., combined PUF 46) and/or confirm the identity of the PUF 45 (e.g., combined PUF 46) and/or a physically associated device 40.

Starting at step/operation 502, a first PUF 45A is designed and implemented. For example, a family and/or type of PUFs may be selected. For example, the first PUF 45A may be chosen to be a PUF using explicitly-introduced randomness (e.g., an optical PUF, a coating PUF, and/or the like) or a PUF using intrinsic randomness (delay PUF, static random access memory (SRAM) PUF, radio frequency (RF) PUF, butterfly PUF, bistable ring PUF, digital Pug, magnetic PUF, metal resistance PUF, quantum confinement PUF, and/or the like). In various embodiments, the first PUF 45A may be chosen to be a PUF comprising an arbiter. In various embodiments, the first PUF 45A may be designed and implemented in accordance with the platform upon which the first PUF 45A is to be implemented (e.g., the device 40 and properties thereof). The first PUF 45A may then be designed and implemented.

At step/operation 504, the influential stages 44 of the first PUF 45A are identified. In an example embodiment, the influential stages of the first PUF 45A are identified by the computing entity 10, 10'. For example, a plurality of challenges 60 may be issued to the first PUF 45A (e.g., via interrogator 20) and corresponding responses 70 received (e.g., via response receiver 30). A plurality of challenge-response pairs (CRPs) for the first PUF 45A may therefore be determined. The CRPs may then be analyzed (e.g., via computing entity 10, 10') to determine if the response and its respective rolled responses can be represented by one or more Boolean functions and/or combinations thereof (e.g., k-junta functions, Linear Threshold functions, and/or the like) over the finite field $\mathbb{F}^2 F2$. In general, a Boolean function is a function that maps elements of the set $\{0, 1\}$ to an assignment. A k-junta function is a Boolean function whose output is determined by an unknown set of k variables. For a small, constant k, the problem of learning k-junta functions is solvable in polynomial-time. Accordingly, the problem of learning (e.g., via a ML attack) PUFs that can be represented by k-junta functions with relatively small k, can be solved within nondeterministic-polynomial (NP) time. In other words, PUFs that can be represented by simple Boolean functions are susceptible to ML attacks.

In various embodiments, a rolled response is a response that has had one or more bits thereof rolled. For example, a first PUF 45A may comprise a plurality of stages. Each of the stages may corresponding to one or more bits of the response (also referred to as response portions herein). For example, the plurality of stages may each provide a response portion that may be combined by an arbiter of the first PUF 45A to generate and/or determine the response for the first PUF 45A based on the challenge 60. In various instances, a response portion from a particular stage can be rolled and swapped with new and/or modified response portion to limit the amount of exposed CRPs from each specific PUF instance. In an example embodiment, the new and/or modified response portion may be generated by and/or based on a different stage and/or a modified stage rather than the particular stage. As a result, any attacker cannot obtain enough CRPs for each individual PUF to create an accurate model for the PUF. In various instances, the stages 44 used to determine the response may be rolled or swapped. For example, various embodiments exploit the partial re-configurability of modern FPGAs to swap only a few stages of a PUF, while the other parts of the PUF remain intact. The reconfiguration of influential stages has the highest impact on obtaining fresh CRPs (e.g., their responses are flipped due to the attribute noise) from a rolled PUF.

In various embodiments, a partial reconfiguration of one or more stages 44 of the first PUF 45A may be performed using the technology of the chip (e.g., component of device 40 and/or otherwise physically associated with device 40) embodying the first PUF 45A. For instance, for reconfigurable FPGAs, the Inside-LUT Configuration or the Input-port Selection approaches can be taken, depending on how effective these approaches are in eliminating, affecting, and/or modifying the influential stages. However, various other reconfiguration possibilities may be employed in various embodiments. For example, any change in the physical system that can remove, affect, and/or modify the influential stages of the first PUF 45A can be considered as a reconfiguration strategy.

At step/operation 506, a rolling strategy is selected. For example, the computing entity 10, 10' and/or a user operating a computing entity 10, 10' may select a rolling strategy. For example, the rolling strategy may include a selection of how many and/or which of the influential stages are rolled each round (e.g., during the generation of a response in response to a challenge 60). For example, when the PUF is associated with an FPGA offering partial reconfiguration, one should choose between inside-stage and input-port-selection. As used herein, a rolled PUF or a rolled version of a PUF refers to the PUF with the one or more stages rolled and/or switched.

A first example rolling strategy is a rotating rolling strategy that includes rolling one stage for each round and rotating which stage is rolled. For example, when determining a response to a first challenge, none of the stages may be rolled. When determining a response to a second challenge, stage 44B may be rolled. When determining a response to a third challenge, stage 44H may be rolled and stage 44B may be unrolled. When determining a response to a fourth challenge, stage 44E may be rolled and stage 44H may be unrolled. When determining a response to a fifth challenge, the process may return to all stages being unrolled. The process may then continue with stage 44B being rolled when determining a response to sixth challenge, for example. In this example, the number of rolling rounds is four. In particular, this example rolling strategy does not repeat within four consecutive challenges. This example rolling strategy may be used with inside-stage, input-port-selection, or other stage reconfiguration process. In this example, stages 44B, 44E, and 44H are the influential strategies of the PUF.

Another example rolling strategy is a changing number of rolled stages rolling strategy that includes rolling various numbers of stages for each round. For example, when determining a response to a first challenge, stages 44B and 44E may be rolled. When determining a response to a second challenge, stages 44B, 44E, and 44H may be rolled. When determining a response to a third challenge, all of the stages may be unrolled. When determining a response to a fourth challenge, Stages 44B and 44H may be rolled. when determining a response to a fifth challenge, stage 44H may be rolled. When determining a response to a sixth challenge, the rolling strategy my return to the strategy used to determine the response to the first challenge, and so on. In this example, the number of rolling rounds is five. In particular, this example rolling strategy does not repeat within five consecutive challenges. This example rolling strategy may be used with inside-stage, input-port-selection, or other stage reconfiguration process. In this example, stages 44B, 44E, and 44H are the influential strategies of the PUF.

At step/operation 508, the number of rolling rounds needed to prevent an attack is determined. For example, the computing entity 10, 10' may determine the number of rolling rounds needed to prevent an attack. For example, the minimum number of CRPs which an adversary requires to mount a provable ML algorithm to model a PUF may be determined and/or considered for given levels of accuracy and confidence. For example, the minimum number of CRPS which an adversary requires to mount a provable ML algorithm to model the PUF to a particular level of accuracy and/or confidence may be dependent on the number of rolling rounds used. Therefore, the designer and/or computing entity 10, 10' can set the number of rolling rounds upfront to prevent an attack based on the desired level of accuracy and/or confidence for the security of the first PUF 45A.

At step/operation 510, the security of the first PUF 45A may be assessed. For example, the computing entity 10, 10' may assess the security of the first PUF 45A and/or the rolled version of the first PUF 45A. For example, the security of the first PUF 45A and its rolled version is assessed by running the low degree algorithm to approximate the accuracy of a model of the first PUF 45A in practice. Based on this approximation, the designer (e.g., operating the computing entity 10, 10') and/or computing entity 10, 10' determines the number of PUFs that should be combined to form a combined PUF 46. For example, two or more PUFs 45A-45N may be combined to form a combined PUF 46. In general, a combined PUF 46 is a plurality of PUFs 45A-45N that, when providing a response to a challenge 60, have their responses combined (e.g., via one or more logic gates 47A-47L) to generate a combined response. For example, a combined PUF 46 may comprise a plurality of PUFs that are used to generate a combined response (rather than providing individual responses). The number of PUFs to be combined for generating the combined PUF 46 may then be implemented. For example, the PUFs 45A-45N may be implemented as independent PUFs configured to provide a combined response to any received challenges. For example, one or more logic gates 47A-47L may be used to combine the responses generated by each of the PUFs 45A-45N to generate a combined response.

At step/operation 512, authentication information/data for the device 40 is determined based on the PUFs 45A-45N and a selected combination function. In various embodiments, the authentication information/data is determined by the computing entity 10, 10'. In an example embodiment, the combination function is a Boolean function, such as a Tribes function. For any $w \in \mathbb{Z}^+$ (the set of positive integers), let $n = n(w)$ be the least integral multiple of w such that $(1 - 2^{-w})^{n/w} \leq \frac{1}{2}$. Then the tribes function on n bits, denoted $Tribes_n$, is the following: Divide the n variables into n/w blocks (called tribes) of size w. $Tribes_n$ is the OR of n/w ANDs of the w variables inside each block. In various embodiments, the bias of all the PUFs 45A-45N of the combined PUF 46 are computed. To generate the combined response, the response generated by PUFs with different levels of bias must be AND-ed together so that for each AND-combined group of responses (corresponding to PUFs with different levels of bias), the minimum level of bias can be achieved. Thus, generating the combined response includes AND-ing the responses of individual/single PUFs within specified groups of individual/single PUFs into AND-ed responses and then OR-ing the AND-ed responses. The specified groups of individual/single PUFs are determined such that the PUFs with different levels of bias are present in each specified group of individual/single PUFs such that when the AND-ed responses are OR-ed together, the minimum level of bias can be achieved.

In various embodiments, to determine which PUFs 45A-45N should be AND-ed together (e.g., which PUFs 45A-45N should be in each of the groups of individual/single PUFs), the PUFs 45A-45N may be implemented and a plurality of CRPs may be collected from the PUFs 45A-45N (e.g., individual responses) such that the bias of each PUF 45A-45N may be computed and/or determined. The PUFs with greatest difference between their biases may be AND-ed together. For example, the first PUF 45A may exhibit the largest bias of the PUFs 45A-45N; second PUF 45B may exhibit the second largest bias of the PUFs 45A-45N; a third PUF 45C may exhibit the second smallest bias of the PUFs 45A-45N; and a fourth PUF 45D may exhibit the smallest bias of the PUFs 45A-45N. Thus, the first PUF 45A and the fourth PUF 45D may be AND-ed together and the second PUF 45B and the third PUF 45C may be AND-ed together. Thus, each set of AND-combined responses provides for a minimum overall level of bias (e.g., the set of biases corresponding to the AND-combined responses is minimized).

The AND-combined responses are OR-ed together to form the combined response. In various embodiments, the arbiter for each of the plurality of PUFs 45A-45N may be designed and/or configured to provide the corresponding single PUF response to the appropriate logic gate 47A-47L such that the single PUF responses are combined in accordance with the combination function to generate the combined response. The combined response is then provided via the response provider 48 (e.g., a network interface, antenna, and/or the like of the device 40 and/or combined PUF 46) such that the response receiver 30 receives the combined response.

At step/operation 514, the authentication information/data for the device 40 (e.g., for the plurality of PUFs 45A-45N and/or combined PUF 46) are stored. For example, the computing entity 10, 10' may store the authentication information/data for the device 40 (e.g., for the plurality of PUFs 45A-45N and/or combined PUF 46). In an example embodiment, the authentication information/data may be generated by issuing a plurality of challenges 60 to the combined PUF 46 and recording the combined responses 70, such that the authentication information/data comprises a plurality of empirically determined CRPs for the combined PUF 46. In an example embodiment, the authentication information/data may include a model of each of the plurality of PUFs 45A-45N and/or the combined PUF 46 such that the expected response for the combined PUF 46 corresponding to a particular challenge may be determined. In various embodiments, the authentication information/data may be stored in an authentication database (e.g., in memory 110, 115, 222, 224). In various embodiments, the authentication information/data may be stored in an encrypted manner.

Authenticating a Device Using a Combined Response

Figure 6:
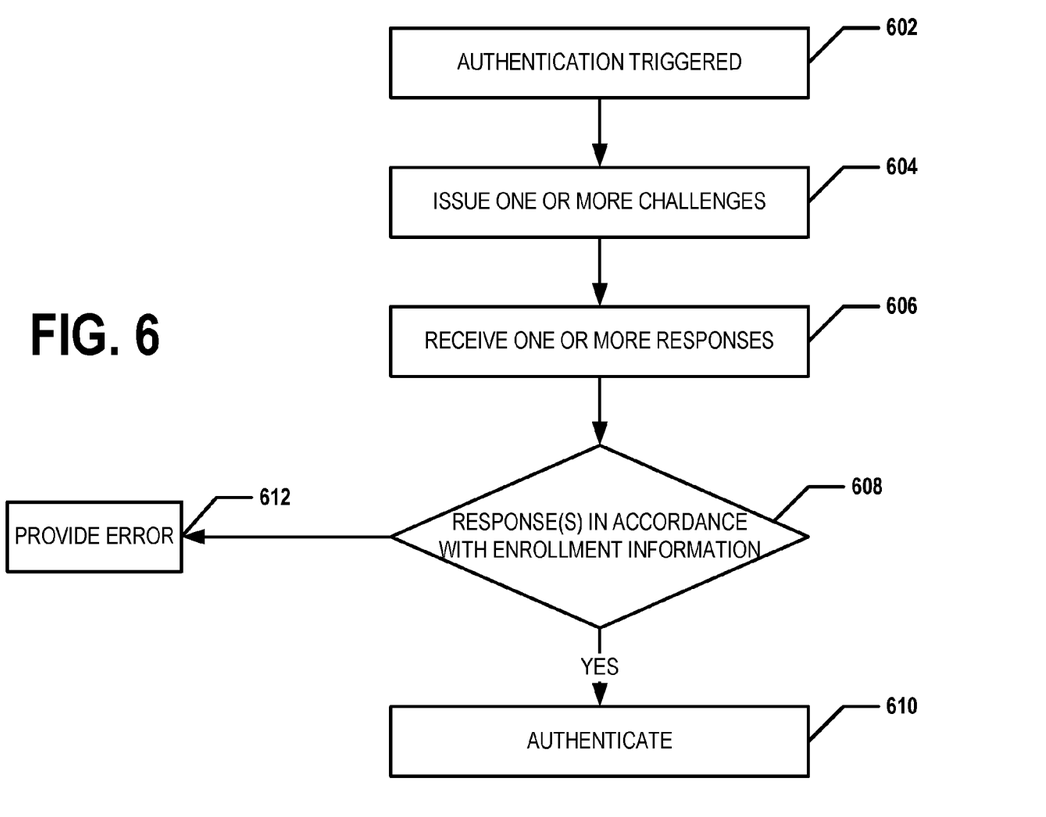
FIG. 6 provides a flowchart illustrating various processes, procedures, and/or operations performed, for example by a computing entity, for authenticating a device based on a PUF physically associated the device according to an example embodiment.

FIG. 6 provides a flowchart illustrating various processes, procedures, operations, and/or the like for authenticating and/or confirming the identity of a device 40 and/or a component thereof using a combined PUF 46. Starting at step/operation 602, authentication of the device 40 and/or a component thereof is triggered. For example, the computing entity 10, 10' may receive and/or determine that authentication of the device 40 and/or a component thereof has been triggered. For example, the computing entity 10, 10' may receive user input via the user interface indicating and/or causing the authentication of the device 40 and/or a component thereof to be triggered. For example, a machine user of the computing entity 10, 10' may cause the authentication of the computing entity 10, 10' to be triggered.

At step/operation 604, the computing entity 10, 10' may cause the interrogator 20 to issue one or more challenges to the device 40. For example, the interrogator 20 may issue one or more challenges 60 and the device 40 and/or one or more PUFs 45A-45N physically associated with the device 40 may receive the one or more challenges. For example, a challenge receiver 42 of the combined PUF 46 and/or device 40 may receive the one or more challenges 60 and provide the challenges to the PUFs 45A-45N.

For example, the plurality of PUFs 45A-45N may receive a challenge of the one or more challenges. Each of the stages of each of the plurality of PUFs 45A-45N generates a response portion. In various instances, the response portion generated by one or more stages may be swapped (e.g., the response portions generated by one or more stations may be rolled by the arbiter 43 of the PUF) in accordance with the rolling strategy determined for the PUFs 45A-45N. In an example embodiment, the arbiter may be configured and/or programmed to swap or roll one or more response portions in accordance with the rolling strategy. In various embodiments, an arbiter may generate a response based on the response portions corresponding to each stage of one of the PUFs 45A-45N and provide the individual PUF response to an appropriate logic gate. The logic gates of the combined PUF 46 may then combine the individual PUF responses generated by the plurality of PUFs 45A-45N using a combination function to form a combined response. For example, the combination function may be a Tribes function. The combined response may then be provided via the response provider 48 (e.g., an antenna, a network interface, and/or the like) such that the response receiver 30 receives the combined response.

At step/operation 606, the computing entity 10, 10' receives one or more combined responses 70. For example, the response receiver 30 may receive one or more combined responses from the one or more PUFs 45A-45N and/or combined PUF 46 in response to the one or more challenges 60. The response receiver 30 provides the one or more combined responses such that the computing entity 10, 10' receives the one or more combined responses.

At step/operation 608, it is determined if the received combined response(s) 70 match the expected response(s) for the combined PUF 46 given the provided challenge(s). For example, the computing entity 10, 10' may determine if the received combined response(s) match the expected response(s) for the combined PUF 46 given the challenge(s) issued to the PUFs 45A-45N. For example, the expected response(s) may be determined based on the authentication information/data stored in the authentication database in association with the PUFs 45A-45N, combined PUF 46, and/or the device 40. In an example embodiment, it may be determined if the received combined response(s) match the expected response(s) for the combined PUF 46 given the challenge(s) issued to the PUFs 45A-45N by taking into account one or more noise profiles.

When, at step/operation 608, it is determined that the received response(s) match the expected response(s), the computing entity 10, 10' authenticates the device 40 and/or component thereof at step/operation 610. When, at step/operation 608, it is determined that the received response(s) does not match the expected response(s), the computing entity 10, 10' does not authenticate the device 40 and/or component thereof and may issue an error, at step/operation 612. For example, the computing entity 10, 10' may display an error via a user interface such that a user operating the computing entity 10, 10' is informed that the device 40 was not authenticated.

Technical Advantages

Various embodiments of the present invention provide technical advantages over traditional PUFs. For example, various embodiments of the present invention provide authentication security for a predetermined and provable level of accuracy and confidence. For example, the rolling strategy for the plurality of PUFs and the number of the plurality of PUFs that are combined to generate the combined PUF (which generates the combined response) may be determined such that the security of the combined PUF is of a provable confidence level. For example, the rolling of stages of the PUFs and combining of the responses of the PUFs add attribute noise into the system to the extent that the PUF can be learned only with a low level of accuracy.

Moreover, the use of the Tribes function as the combination function includes particular advantages. First, the Tribes functions exhibit properties related to the noise sensitivity that are helpful in providing a high level of hardness for the combined PUF. Secondly, the outputs of the Tribes functions remain balanced in the presence of attribute noise. Thus, the combined PUF, and in particular the combined PUF where the Tribes function is used as the combination function, provide technical improvements in the field of PUF enabled security and/or authentication of devices using PUFs.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A combined physical unclonable function (PUF) comprising:
 a plurality of PUFs, each PUF comprising a plurality of stages and an arbiter configured to generate a single PUF response based on response portions generated by the plurality of stages; and
 one or more logic gates, the one or more logic gates configured to combine the single PUF response for each of the plurality of PUFs in accordance with a combination function, wherein a number of the plurality of PUFs is determined based on a desired level of security for the combined PUF and the number of the plurality of PUFs for the desired level of security is determined based on a low degree algorithm approximation of the security of the combined PUF.

2. The combined PUF of claim 1, wherein the single PUF responses comprise one or more rolled response portions.

3. The combined PUF of claim 2, wherein the one or more rolled response portions each correspond to an influential stage of the corresponding PUF.

4. The combined PUF of claim 2, wherein a rolling strategy used to determine the one or more rolled response portions is determined based on a desired level of security for the combined PUF.

5. The combined PUF of claim 1, wherein the combination function is a Tribes function.

6. A method for enrolling a combined physical unclonable function (PUF), the method comprising:
 implementing a first PUF;
 based on an analysis of the first PUF, determining a number of PUFs for the combined PUF;
 determining influential stages of the first PUF;
 based on the influential stages, determining a rolling strategy for rolling one or more stages of the first PUF, wherein the rolling strategy comprises reconfiguring at least one stage of the one or more stages; and
 implementing the number of PUFs such that the rolling strategy is implemented for each PUF of the number of PUFs and a response of each PUF of the number of PUFs is combined in accordance with a combination function to generate a combined response.

7. The method of claim 6, wherein the combination function is a Tribes function.

8. The method of claim 6, further comprising determining a bias for each PUF of the number of PUFs.

9. The method of claim 8, further comprising AND-ing together, via one or more logic gates, two or more PUFs having different levels of bias so that, for each AND-combined group of PUFs, a minimum level of bias is achieved.

10. The method of claim 9, further comprising OR-ing together, via one or more logic gates, two or more AND-combined groups of PUFs to generate a combined response.

11. The method of claim 6, further comprising, generating authentication information for the combined PUF and storing the authentication information.

12. The method of claim 11, wherein the authentication information is stored in an authentication database.

13. The method of claim 12, wherein the authentication database is an encrypted database.

14. The method of claim 6, wherein the number of PUFs is determined based on a desired level of security for the combined PUF.

15. A method of authenticating a device, wherein the device is physically associated with a combined PUF, the method comprising:
 issuing a challenge to the combined PUF;
 receiving a response from the combined PUF; and
 determining whether the response matches an expected response based on the challenge and authentication information stored in association with an identifier configured to identify the combined PUF, wherein the combined PUF generates the response by determining a plurality of individual responses, each of the plurality of individual responses generated by one of a plurality of PUFs of the combined PUF, and combining the plurality of individual responses in accordance with a combination function, wherein the combination function is a Tribes function.

16. The method of claim 15, wherein the authentication information was generated in part by:
 determining a bias for each PUF of the number of PUFs; and
 AND-ing together, via one or more logic gates, two or more PUFs having different levels of bias so that, for each AND-combined group of PUFs, a minimum level of bias is achieved.

17. The method of claim 16, wherein the authentication information was generated in part by OR-ing together, via one or more logic gates, two or more AND-combined groups of PUFs to generate a combined response.

18. The method of claim 15, wherein the authentication information comprises a plurality of empirically determined challenge-response pairs for the combined PUF.

19. The method of claim 15, wherein determining whether the response matches an expected response based on the challenge and the authentication information comprises taking into account a noise profile.

\* \* \* \* \*